(12) United States Patent
Lin

(10) Patent No.: US 6,474,192 B2
(45) Date of Patent: Nov. 5, 2002

(54) BOTTOM BRACKET BEARING AXLE MOUNTING ARRANGEMENT

(76) Inventor: Wen-Hwa Lin, No. 816, Chang Shen Rd., Tian San Chun, Wei Pu Hsiang, Taichung Hsien (TW)

( * ) Notice: Subject to any disclaimer, the term of this patent is extended or adjusted under 35 U.S.C. 154(b) by 32 days.

(21) Appl. No.: 09/804,147

(22) Filed: Mar. 13, 2001

(65) Prior Publication Data

US 2002/0129676 A1 Sep. 19, 2002

(51) Int. Cl.[7] ............................. G05G 1/14; F16C 43/00
(52) U.S. Cl. ..................... 74/594.1; 384/540; 384/545
(58) Field of Search ........................ 74/594.1; 384/458, 384/540, 545, 544; 403/370, 371, 372, 357, 358

(56) References Cited

U.S. PATENT DOCUMENTS

| 5,437,510 A | * | 8/1995 | Jeng | ........................... 384/540 |
| 5,572,909 A | * | 11/1996 | Chi | ........................... 74/594.1 |

FOREIGN PATENT DOCUMENTS

| GB | 23902 | * | 10/1896 | ................. 384/545 |

* cited by examiner

Primary Examiner—Douglas C. Butler
Assistant Examiner—Thomas Williams
(74) Attorney, Agent, or Firm—Varndell & Varndell, PLLC

(57) ABSTRACT

A bottom bracket bearing axle mounting arrangement includes a bottom bracket bearing axle inserted through a bottom bracket, two ball races mounted on the bottom bracket bearing axle to support a respective set of steel balls around the bottom bracket bearing axle, and two conical, externally threaded, split stop members respectively threaded into a respective inner thread at each of two opposite ends of a bottom bracket to hold two sets of steel balls on the respective ball race.

1 Claim, 4 Drawing Sheets

BOTTOM BRACKET BEARING AXLE MOUNTING ARRANGEMENT

BACKGROUND AND SUMMARY OF THE INVENTION

The present invention relates to bicycles and, more specifically, to a bottom bracket bearing axle mounting arrangement for bicycle, which eliminates clearance of teeth, keeping the bottom bracket bearing axle stably supported in place.

A regular bicycle comprises a bottom bracket bearing axle mounted in a bottom bracket to hold two crank and pedal assemblies for pedaling. FIG. 1 shows a bottom bracket bearing axle mounting arrangement according to the prior art. As illustrated in FIG. 1, a bottom bracket bearing axle 92 is inserted through a bottom bracket 91, two ball races 93 are mounted on the bottom bracket bearing axle 92 inside the bottom bracket 91, two sets of steel balls 94 are respectively supported on the ball races 93 around the periphery of the bottom bracket bearing axle 92, two threaded stop members 95 respectively sleeved onto the bottom bracket bearing axle 92 and threaded into a respective inner thread at each of two opposite ends of the bottom bracket 91 to hold the two sets of steel balls 94 on the ball races 93 around the bottom bracket bearing axle 92, and two locating rings 96 respectively fastened to the threaded stop members 95 outside the bottom bracket 91. After installation, the two distal ends 922 of the bottom bracket bearing axle 92 are disposed outside the bottom bracket 91 for the mounting of the respective crank and pedal assemblies. This design of bottom bracket bearing axle mounting arrangement is still not satisfactory in function. Because there is a clearance of teeth between the outer thread of each threaded stop member and the respective inner thread of the bottom bracket, the steel balls are not stably supported on the respective ball races, and the bottom bracket bearing axle may vibrate when pedaling the pedals of the crank and pedal assemblies.

The present invention has been accomplished to provide a bottom bracket bearing axle mounting arrangement, which eliminates the aforesaid problem. According to the present invention, the stop members holding the respective sets of steel balls on the respective ball races are hollow, conical, externally threaded, split stop members. Because the stop members each have splits, the cross section of each stop member where the respective splits passed is radially compressible. Therefore, the stop members can be fastened to the respective inner threads of the bottom bracket tightly to hold the respective sets of steel balls on the respective ball races stably, and no clearance of teeth is left between the outer thread of each stop member and the corresponding inner thread of the bottom bracket after installation of the stop members in the bottom bracket.

DETAILED DESCRIPTION OF THE PREFERRED EMBODIMENT

Figure 1:
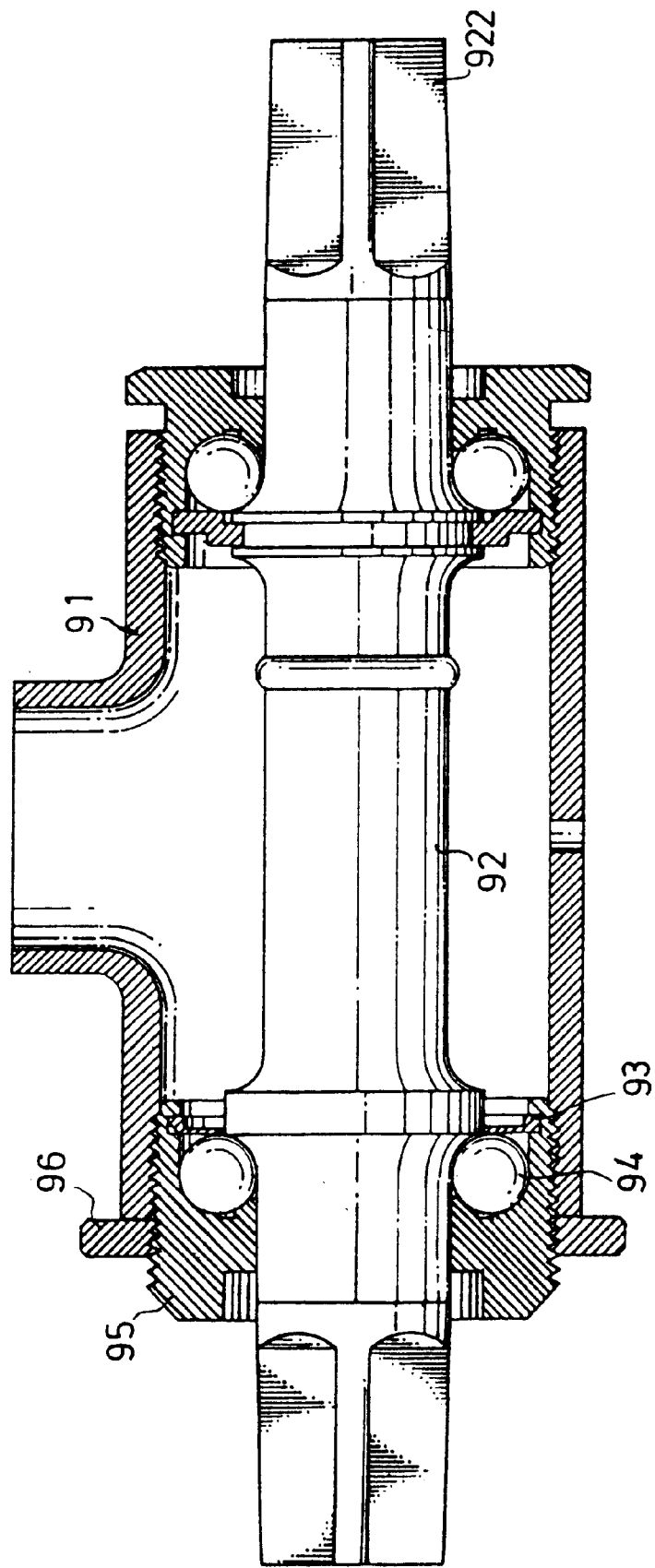
FIG. 1 is a sectional view of a bottom bracket bearing axle mounting arrangement according to the prior art.
Figure 2:
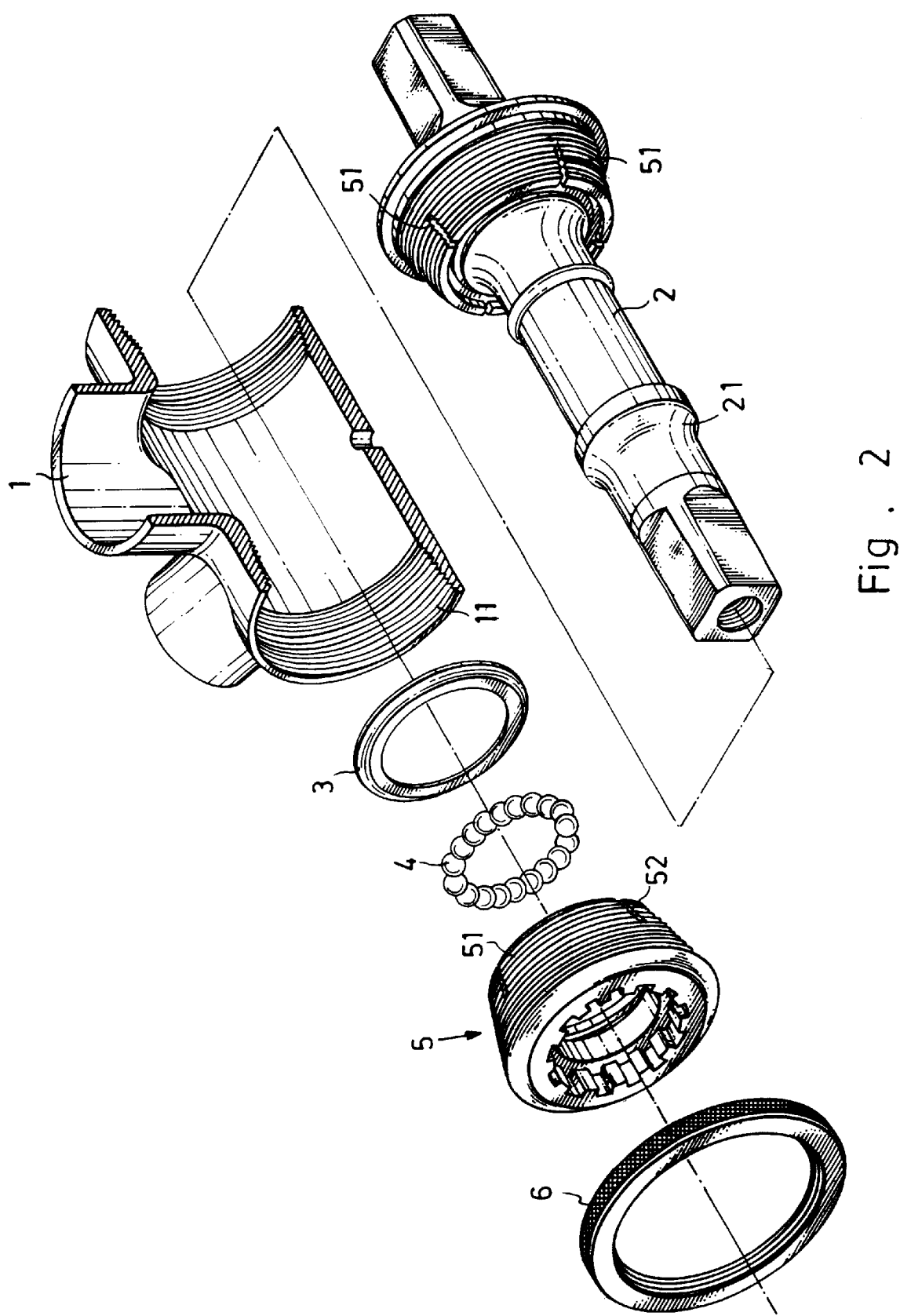
FIG. 2 is an exploded view of the present invention.
Figure 3:
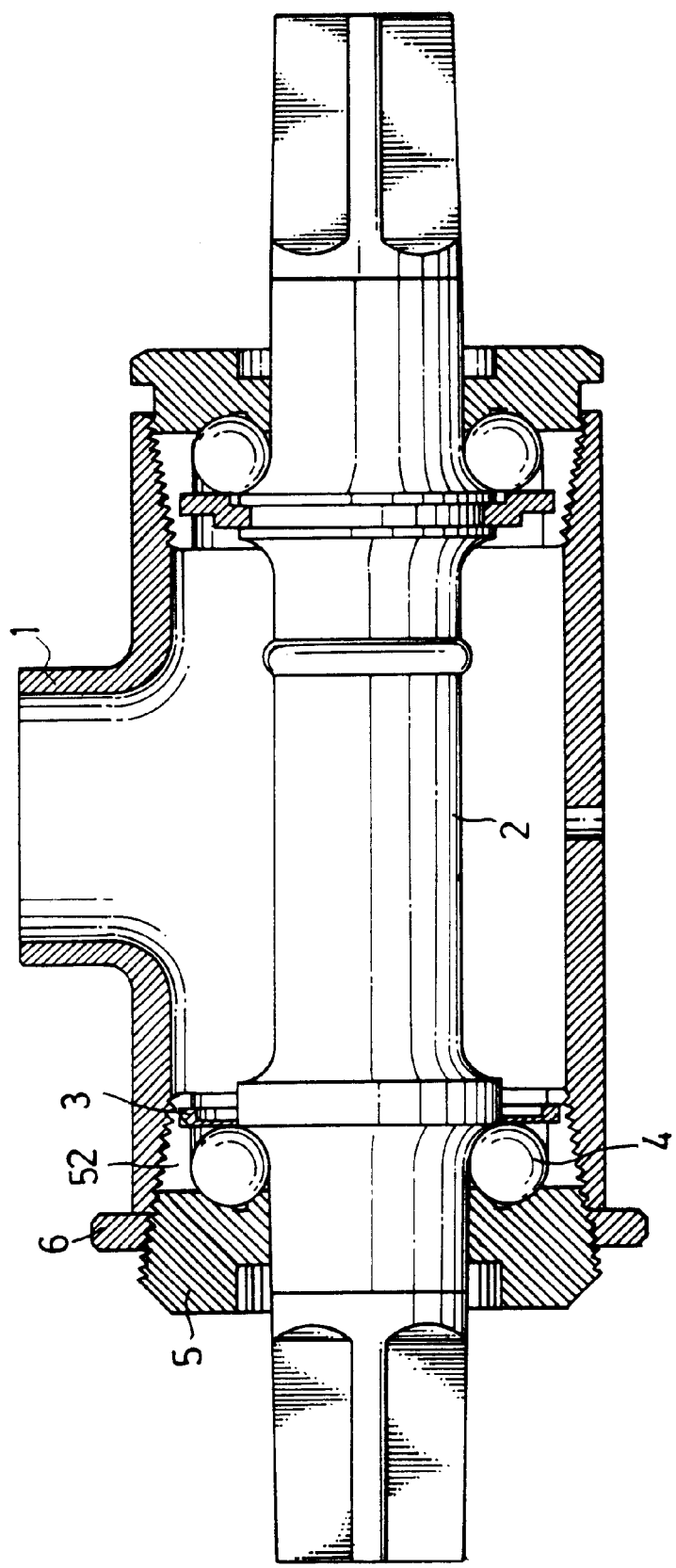
FIG. 3 is a sectional assembly view of the present invention.

Referring to FIGS. 2 and 3, the present invention comprises a bottom bracket 1, a bottom bracket bearing axle 2 inserted through the bottom bracket 1, two ball races 3 respectively mounted on the bottom bracket bearing axle 2 inside the bottom bracket 1, two sets of steel balls 4 respectively supported on the ball races 3 in a respective recessed bearing portion 21 around the periphery of the bottom bracket bearing axle 2, two stop members 5 respectively fastened to two horizontally aligned opposite ends of the bottom bracket 1 around the bottom bracket bearing axle 2 to hold the sets of steel balls 4 in place, and two locating rings 6 respectively fastened to the periphery of the stop members 5 outside the bottom bracket 1.

Referring to FIGS. 2 and 3 again, the stop members 5 are hollow conical members, each comprising an outer thread 51 extended around the tapered periphery thereof, and a plurality of longitudinal splits 52 equiangularly spaced around the tapered periphery an cut through a part of the outer thread 51. The bottom bracket 1 has two inner threads 11 respectively disposed around the inside wall of the two horizontally aligned opposite ends. The outer thread 51 of each of the stop members 5 is respectively threaded into the inner thread 11 at each end of the bottom bracket 1 to hold the sets of steel balls 4 on the respective ball races 3.

Figure 5:
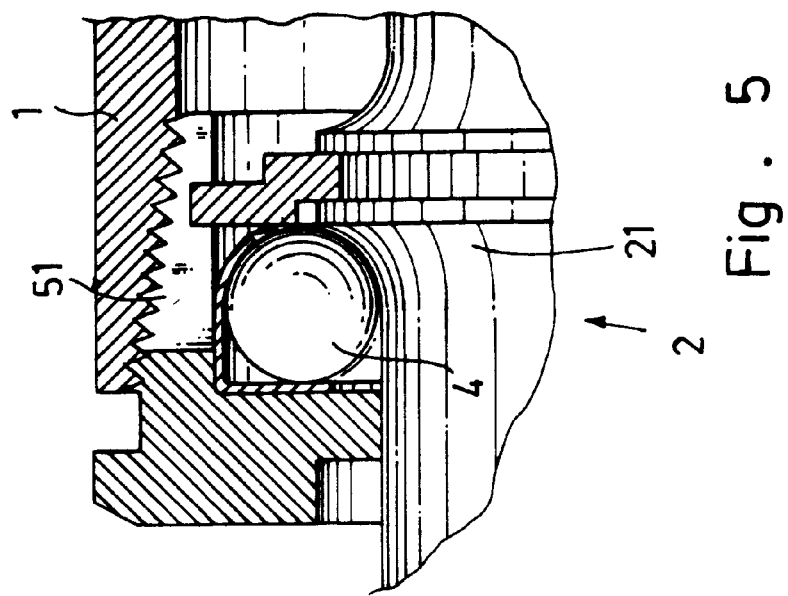
FIG. 5 is similar to FIG. 4 but showing the stop member fastened up, the clearance of teeth disappeared.
Figure 4:
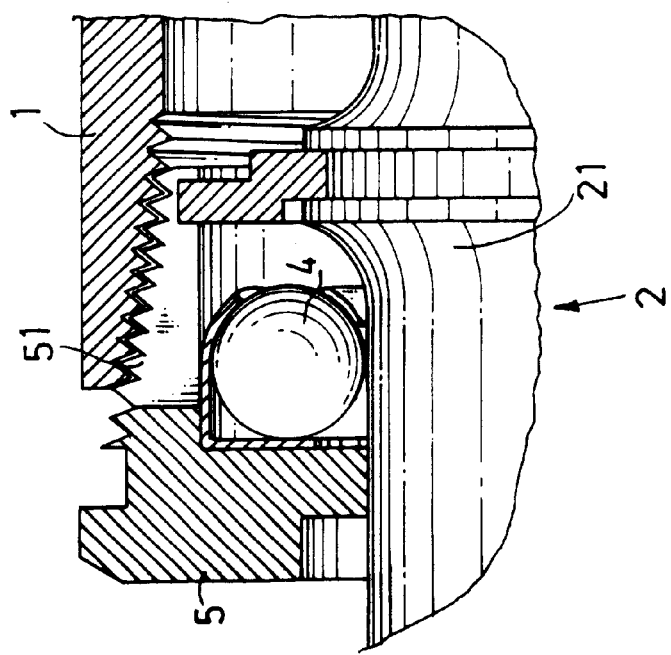
FIG. 4 is an enlarged view of a part of the present invention showing a clearance of teeth left between the outer thread of the stop member and the respective inner thread of the bottom bracket before tight engagement of the stop member into the bottom bracket.

Referring to FIGS. 4 and 5, when threading the outer thread 51 of one stop member 5 into one inner thread 11 of the bottom bracket 1, the split front end of the stop member 5 is radially inwardly compressed. After the stop members 5 have been installed in the bottom bracket 1 and fastened up respectively, the longitudinal splits 52 provide a space for deformation, enabling the outer thread 51 of each stop member 5 to be maintained in positive engagement with the corresponding inner thread 11 of the bottom bracket 1. Therefore, the arrangement of the present invention eliminates clearance of teeth between the stop members 5 and the inner threads 11 of the bottom bracket 1.

While only one embodiment of the present invention has been shown and described, it will be understood that various modifications and changes could be made thereunto without departing from the spirit and scope of the invention disclosed.

What is claimed is:

1. A bottom bracket bearing axle mounting arrangement comprising bottom bracket, a bottom bracket bearing axle inserted through said bottom bracket, said bottom bracket bearing axle comprising two recessed bearing portions spaced around the periphery thereof, two ball races respectively mounted on said bottom bracket bearing axle inside said bottom bracket, two sets of steel balls respectively supported on said ball races and arranged in said recessed bearing portions of said bottom bracket bearing axle, two top members respectively fastened to two horizontally aligned opposite ends of said bottom bracket around said bottom bracket bearing axle to hold said sets of steel balls in place, and two locating rings respectively fastened to the periphery of each of said stop members outside said bottom bracket, wherein said stop members are a hollow conical members, each comprising a tapered periphery and an outer thread extended around said tapered periphery and threaded into a respective inner thread at said bottom bracket, and a plurality of longitudinal splits equiangularly spaced around said tapered periphery and cut through a part of said outer thread.

* * * * *